N. E. WILLIAMS.
PISTON.
APPLICATION FILED JULY 22, 1921.

1,424,701.

Patented Aug. 1, 1922.

Noel E. Williams
INVENTOR

BY *Victor J. Evans*
ATTORNEY

WITNESS:

UNITED STATES PATENT OFFICE.

NOEL E. WILLIAMS, OF CANYON, TEXAS.

PISTON.

1,424,701.  Specification of Letters Patent.  Patented Aug. 1, 1922.

Application filed July 22, 1921. Serial No. 486,830.

*To all whom it may concern:*

Be it known that I, NOEL E. WILLIAMS, a citizen of the United States, residing at Canyon, in the county of Randall and State of Texas, have invented new and useful Improvements in Pistons, of which the following is a specification.

My present invention has reference to improvements in the construction of pistons for internal combustion engines.

My object is to provide a piston with means whereby the same may be effectively lubricated for the major portion of the length thereof and which will also deliver the lubricant to the cylinder, and consequently insure the free working of the piston in the cylinder without interfering with the necessary tight engagement between the piston rings and cylinder.

The drawings illustrate a satisfactory illustration of my improvement reduced to practice.

In the drawings:—

Figure 1:
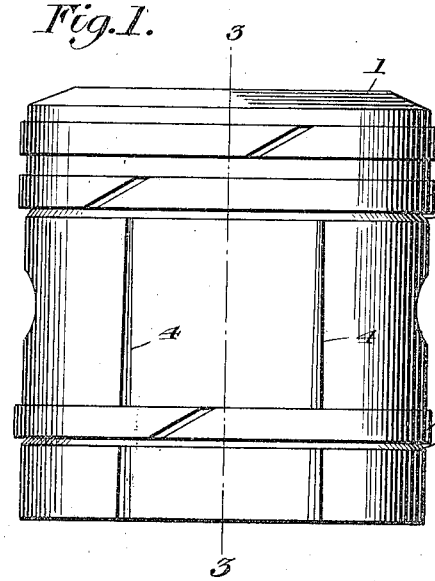
Figure 1 is an elevation of a piston in accordance with this invention.
Figure 2:
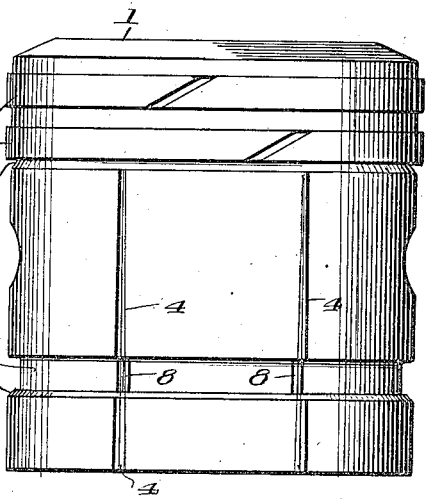
Figure 2 is a similar view with the lower piston ring removed.
Figure 3:
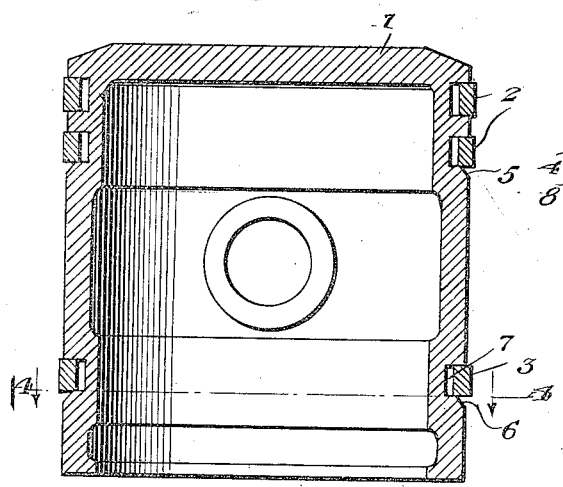
Figure 3 is a sectional view on the line 3—3 of Figure 1.
Figure 4:
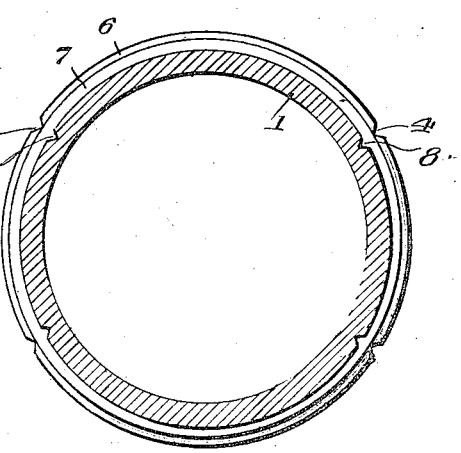
Figure 4 is a sectional view on the line 4—4 of Figure 2.

As disclosed by the drawings, my improved piston is of the ordinary construction, the same, adjacent to its head being provided with spaced grooves in which are received the piston rings 2 and adjacent its bottom with a similar groove for the lower piston ring 3. On its opposed sides, and from its lower edge the outer surface of the piston is formed with grooves 4. Preferably two such grooves are arranged on each side of the piston, and the said grooves gradually increase in width and depth from their upper to their lower ends. Also, preferably, the grooves are substantially V-shaped. The lower corner of the groove receiving the inner piston ring 2 is provided with a continuous depression 5 that communicates with the grooves 4, and the lower corner provided by the groove that receives the piston ring 3 is likewise formed with a continuous depression 6. Also, if desired, the inner wall of the groove 7 that receives the piston ring 3 as well as the opposed walls provided by the said groove may have communicating grooves or depressions 8 in a line with the grooves 4. In this manner, the lubricant can pass through the groove 7 inwardly of the piston ring 3 in a substantially continuous flow.

The continuous depressions 5 and 6 have their walls arranged at a downward and outward angle, and said angle walls are pitched at approximately 45°. These angle depressions provide directing surfaces for the lubricant.

It is believed that the foregoing description, when taken in connection with the drawings will fully set forth the construction and advantages of the improvement and that further detailed description will not be necessary.

Having described the invention, I claim:—

A piston having the usual grooves for the expansible piston rings, the lower corners provided by the lowermost and next to the lowermost grooves being formed with continuous depressions, the outer face of the piston having longitudinal grooves entering from the lower end of the piston and terminating with the upper annular depression, said last mentioned grooves being gradually widened and increasing in depth from the upper to the lower ends thereof, and the groove receiving the lowermost piston ring having its opposed and inner walls provided with continuous grooves which communicate with the longitudinal grooves.

In testimony whereof I affix my signature.

NOEL E. WILLIAMS.